April 17, 1962    A. M. CAMPBELL ET AL    3,030,595
CONTROL APPARATUS
Filed Aug. 6, 1959    2 Sheets-Sheet 1
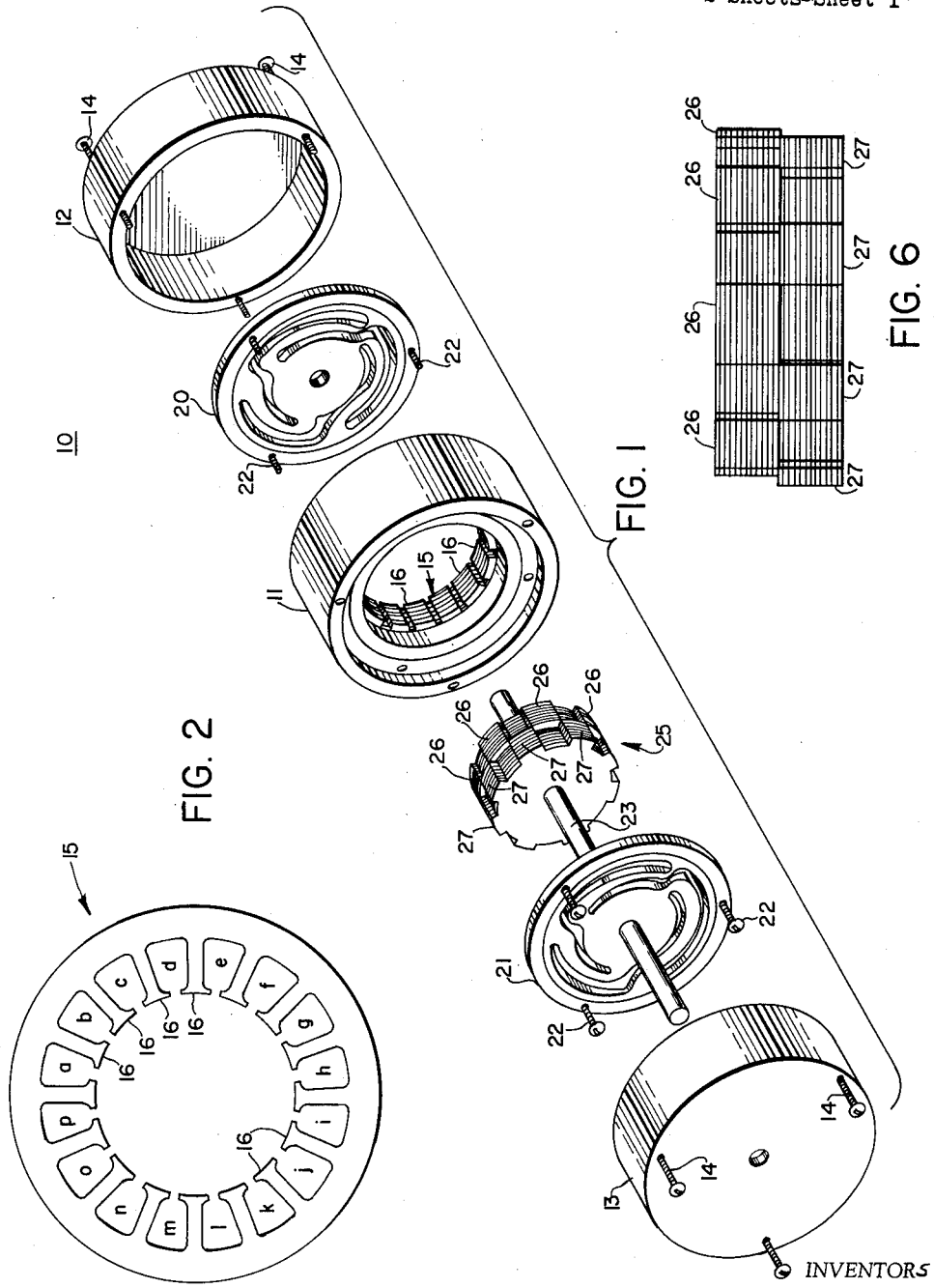
INVENTORS
ALAN M. CAMPBELL
LEONARD P. ENTIN
BY Roger W. Jensen
ATTORNEY April 17, 1962   A. M. CAMPBELL ETAL   3,030,595
CONTROL APPARATUS
Filed Aug. 6, 1959   2 Sheets-Sheet 2

INVENTORS
ALAN M. CAMPBELL
LEONARD P. ENTIN
BY Roger W. Jensen
ATTORNEY

United States Patent Office 3,030,595
Patented Apr. 17, 1962

3,030,595
CONTROL APPARATUS
Alan M. Campbell, Weston, and Leonard P. Entin, Wayland, Mass., assignors to Minneapolis-Honeywell Regulator Company, Minneapolis, Minn., a corporation of Delaware
Filed Aug. 6, 1959, Ser. No. 832,086
5 Claims. (Cl. 336—30)

This invention relates to control apparatus and more particularly to a rectilinear inductive device for use as a mechanical to electrical transducer. The present invention is an improvement over our copending application entitled "Control Apparatus," Serial No. 771,994, filed November 5, 1958.

In said copending application a rectilinear mechanical to electrical transducer is shown and in many respects is similar to the present invention but has a different winding configuration than the present invention. Both the present invention and said copending application are characterized by having the same type of magnetic core structure including a first member having at least four salient poles and a second magnetic member having salient poles corresponding in number to the number of poles on the first magnetic member. The poles on the second magnetic member are characterized by being positioned alternately on one side and the other side of a right radial plane intersecting said second member. The two members are adapted to be positioned with respect to each other so that the right radial plane of the one member normally bisects the other member. When there is relative movement of one sense between the two members then there is an increased amount of coupling between half of the poles and a decreased amount of coupling with the other half. The reverse situation is true when there is relative movement of the opposite sense.

In said copending application each of the poles has a separate primary winding and a separate secondary winding. The secondary windings are connected in series opposing relation. When the two magnetic members are at their null position, the voltages induced in the secondary windings are equal and opposite and when added together produce a net output signal approximating zero. There are several factors which cause the null output signal to deviate somewhat from the desired zero level. One reason is because there may be a difference in the number of turns in the coils on the various poles caused by production inaccuracies. Further, when summing together relatively large voltages a small percentage difference between the voltages will produce a substantial net signal when the voltages are subtracted.

It should therefore be understood that the transducer described in our copending application has the disadvantage of the voltage bucking type of pickoff.

The present invention overcomes the disadvantage of the invention in the copending application by having a different winding configuration and theory of operation. In the present invention a first continuous or skein winding is used for all of the primary energization to the first magnetic member. The skein winding is placed on the first magnetic member so as to encircle pairs of adjacent poles, encircling the first pair of adjacent poles in one sense, the next set of adjacent poles in the opposite sense, the next set of poles in the first sense and so on until all of the sets of poles have been encircled. The first skein winding is adapted to be energized by electric current and when so energized will produce magnetic flux in the poles of the first member. The flux for each pair of encircled poles will be in the same direction but the flux in the pairs of poles adjacent to the first pair of poles will be in the opposite direction. The present invention provides a second continuous or skein winding encircling a second set of pairs of adjacent poles of the first member. Again the second skein winding encircles adjacent pairs of poles in the opposite sense as was the case for the first skein winding but the second skein winding is displaced by at least one pole width from the first skein winding.

At null condition the two magnetic members are symmetrically positioned with respect to each other so that there is substantially the same amount of flux flowing between cooperating poles on the two magnetic members. For this null condition each of the loops of the second skein winding has a net flux linkage of zero since the pair of poles that each loop encircles is characterized by one having flux of one sense while the other has flux of the opposite sense. Thus the present device is a flux bucking type of transducer. Since all of the individual loops of the second skein winding have zero output at null it follows that the total output from the second skein winding will also be zero at null. The individual fluxes are substantially equal due to the fact that skein windings are used for the energization of the first magnetic member so that there can be no difference in number of turns as is possible for the voltage bucking type of pickoff described in our copending application.

It is therefore an object of this invention to provide an improved control apparatus.

Another object of the present invention is to provide an improved electromagnetic transducer.

Other objects of the invention will be set forth more fully in and become apparent from a reading of the following specification and claims in conjunction with the accompanying drawings in which:

FIGURE 1 is an exploded view of an electromagnetic transducer embodying the principles of the invention;

FIGURE 2 is a plan view of the stator member;

FIGURE 6 is a side view of the armature element; and

Figure 4:
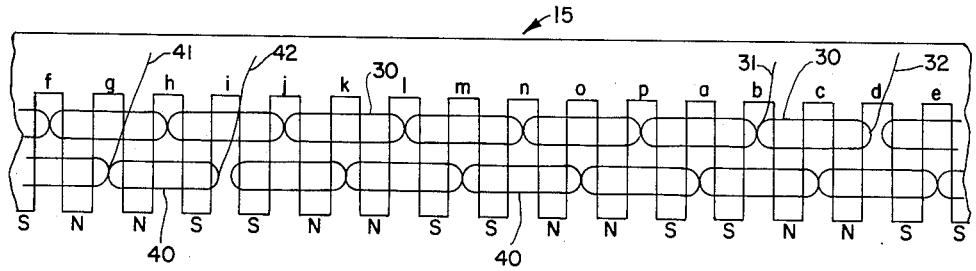
FIGURE 4 is a somewhat schematic representation of the stator showing the relationship between the poles and both skein windings thereon.

Referring to FIGURE 1, the reference numeral 10 generally depicts an electromagnetic transducer including a central hollow cylindrical housing element or member 11 which has cooperating end caps 12 and 13 adapted to be secured thereto by suitable means such as machine screws 14. Housing member 11 serves as a support means for a first magnetic member or stator element 15 characterized by having a plurality of salient poles 16 extending radially toward the longitudinal axis of the housing 11. Stator element 15 will be described in more detail below.

A pair of resilient diaphragms 20 and 21 are secured by suitable means such as machine screws 22 to the central housing 11 and are adapted to resiliently support a shaft 23 for rectilinear reciprocating relative to the housing 11. Rigidly connected to the shaft 23 is an armature element generally identified by the reference numeral 25 and which is characterized by having two groups of spaced apart salient poles 26 and 27. The total number of salient poles 26 and 27 is equal to the number of salient poles 16 on the stator element 15. The salient poles 26 of the armature element are displaced on one side of a right radial plane intersecting the armature element 25 while the salient poles 27 are on the opposite side of the right radial plane. The armature portion including poles 26 is angularly rotated from the portion including poles 27 by approximately one pole width so that the poles 26 and 27 are not in register. As may be seen in FIGURE 5 the armature element 25 is normally oriented relative to the stator element 15 so that each of the stator poles 16 is radially aligned with a pole of the armature element 25. Since the armature poles 26 and 27 are alternately positioned around the periphery of the armature element 25 it follows that one stator 16 will be radially aligned with an armature pole 26 while the stator poles 16 on either side of the first pole will be radially aligned with an armature pole 27. Further, at null position the armature 25 is positioned by the resilient support means relative to the stator element 15 so that the armature 25 is symmetrically located with respect to the stator element 15 as is clearly shown in FIGURE 7.

Referring to FIGURE 2, the side view of the stator 15 is shown. It will be noted for this particular embodiment of the invention that a total of sixteen poles 16 are provided defining sixteen slots therebetween identified by reference letters *a* through *p*.

A first continuous skein winding 30 is placed on the stator 15 and is characterized by encircling a first set of pairs of adjacent poles thereon. The skein winding 30 is shown clearly in FIGURES 3 and 4 as encircling pairs of adjacent poles by being crossed over in slots *f, h, j, l, n, p, b* and *d*. The two ends of the skein winding are shown to lie in slot *d*. Leads 31 and 32 are provided for external connections to the skein winding 30.

Figure 3:
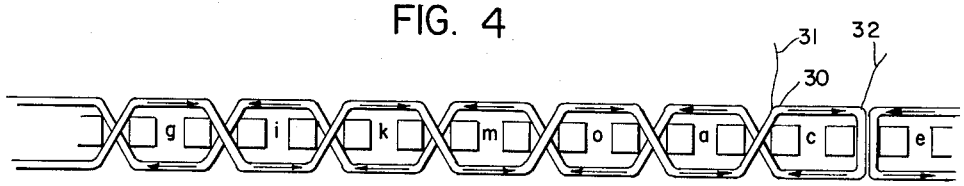
FIGURE 3 is a developed view of the stator looking from the inside of the stator stack showing a skein winding wound about the successive pairs of adjacent poles.

Referring to FIGURE 3 it will be noted that due to the crossing over of the skein winding 30 in the slots listed above that energization to the winding 30 through the connecting leads 31 and 32 will cause flux to be produced in the poles encircled which is in the same direction in both poles of each pair so encircled but is in opposite directions for adjacent pairs. In one embodiment the leads 31 and 32 would be energized by alternating current producing on an instantaneous basis the north and south polarities as shown in FIGURE 4.

A second continuous skein winding 40 is also placed on the stator 15 and likewise encircles pairs of adjacent poles but is displaced by one pole from the first skein winding 30. As depicted the two ends of the skein winding 40 lie in slot *i* and it is crossed over in slots *k, m, o, a, c, e* and *g*. A pair of connecting leads 41 and 42 provides a means of connecting the ends of the skein winding 40 to a suitable control apparatus.

Figure 5:
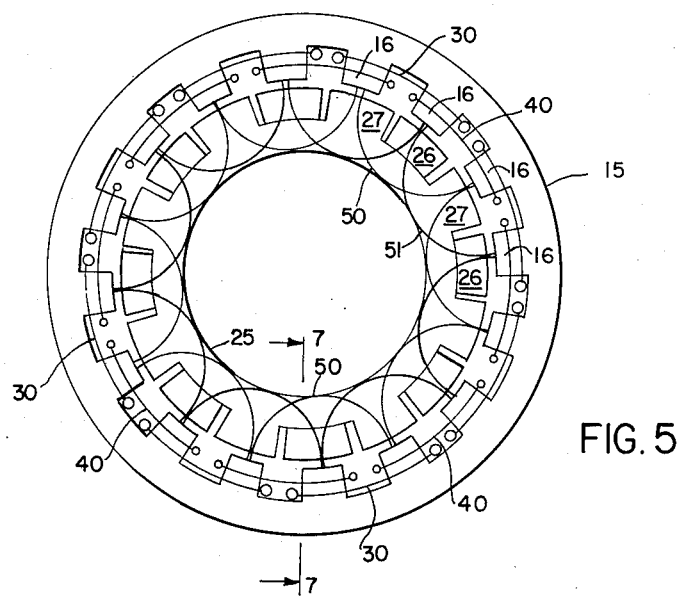
FIGURE 5 is a view showing the two magnetic members positioned with respect to each other, with the windings schematically depicted on one of the members and with the fluxes represented.

Referring to FIGURE 5 the stator element 15 and the armature element 25 are shown in assembled relationship and the two skein windings 30 and 40 are shown somewhat schematically. Again it will be observed that the skein windings 30 and 40 each encircle adjacent pairs of poles on the stator element 15 and that the skein winding 40 is displaced by one pole from the skein winding 30. The flux flowing in the magnetic circuit including stator poles 16 and armature poles 27 is identified by reference numeral 50 and the flux flowing in the magnetic circuit including stator poles 16 and armature 26 is identified by the reference numeral 51. It will be understood that normally the stator element 15 and armature element 25 will be laminated core structures so that the lowest reluctance for flux flow is in the plane of the laminations instead of going transverse or across the laminations.

Figure 7:
FIGURE 7 is a cross sectional view of the apparatus shown in FIGURE 5 as viewed along section line 7—7 with the winding means not shown.

In FIGURE 5 the armature element 25 may be assumed to be positioned symmetrically with respect to the stator element 15 as is shown in FIGURE 7. Under this orientation of elements 15 and 25 the flux 50 will be equal to the flux 51. For this condition it will be understood that each loop of the skein winding 40 has a net flux linkage of zero due to the fact that each loop encircles a pair of stator poles 16 having instantaneous opposite polarities as explained above in connection with FIGURE 4. The output from the skein winding 40 is received at leads 41 and 42 and for the null position or symmetrical position of elements 15 and 25 as shown in FIGURE 7 there will be zero net output at leads 41 and 42.

Assume a relative axial shifting between the armature element 25 and the stator element 15 so that the armature element 25 effectively moves out of the plane of the paper in FIGURE 5 toward the viewer. This will tend to decrease the reluctance in the magnetic circuits traversed by the magnetic flux 51 so that flux 51 increases in magnitude. Conversely the reluctance in the magnetic circuits traversed by magnetic flux 50 increases so as to decrease the magnitude of the flux 50. The individual loops of the skein winding 40 now each have a net flux linkage the magnitude of which is a function of the relative axial shifting between the armature element 25 and the stator element 15. Each adjacent loop will have the opposite type of flux change, that is, one loop will have flux leaving the stator and entering the armature while the adjacent loops will have a flux that is leaving the armature and entering the stator. However, due to the crossing over of the skein winding 40 as indicated the voltages induced in the respective loops aid each other so that there is a net output at leads 41 and 42.

For the other sense of relative movement between the armature element 25 and the stator element 15 away from the null signal producing position, the magnetic circuits again become unbalanced in the reverse sense of the first unbalance. Assuming armature element 25 in FIGURE 5 is moved below the plane of the paper away from the viewer, the reluctance of the circuit through which flows the flux 50 decreases so as to increase the total magnitude of the flux 50 while at the same time the reluctance of the circuit through which flows the flux 51 increases thereby decreasing the magnitude of the flux 51. This will cause a net flux to be linked by each of the loops of the skein winding 40, the net flux being of the opposite sense for the previous example given. Therefore a net output voltage will appear at the leads 41 and 42 of opposite sense to the signal which appeared for the first example given. Again the magnitude of the output voltage will be indicative of the magnitude of the relative axial displacement between the armature 25 and the stator 15. In general the electromagnetic transducer shown and described produces a signal of a sense and magnitude indicative of the sense and magnitude of relative axial displacement between the two magnetic core members.

It will be understood that the invention may be practiced in many different forms, the minimum number of salient poles on the stator element being four.

For the examples given the device was described as a displacement transducer wherein the winding terminations 31 and 32 were energized by alternating current. It will also be understood that the device may be used as a velocity generator wherein the winding terminations 31 and 32 for the skein winding 30 are connected to a direct current energization producing a fixed polarization to the poles 16 of the stator element 15. Then movement of the armature 25 relative to the stator 15 will produce changes in the magnitude of the fluxes 50 and 51. The sense of the net flux linkage for each loop of the skein winding 40 will be indicative of the sense of relative movement between the stator element 15 and the armature element 25 and the rate of change of the net flux will be indicative of the rate of change between the stator and the armature. Since the voltage induced is proportional to the rate of change of the flux linkages it follows that the output voltage at leads 41 and 42 of the skein winding 40 will be indicative of the sense and rate of change of movement between the armature 25 and the stator 15.

While we have shown and described a specific embodiment of the invention, further modifications and improvements will occur to those skilled in the art. We desire therefore that this invention be not limited to the particular form shown and that the appended claims cover all modifications which do not depart from the spirit and scope of the invention.

What we claim is:

1. In a rectilinear inductive pickoff: a first magnetic member having at least four salient poles; a second magnetic member having salient poles corresponding in number to the number of poles of said first magnetic member and the poles of said second member being positioned alternately on one side and the other side of a right radial plane intersecting said second member; a first skein winding means encircling a first set of pairs of adjacent poles of one of said members, one pair being encircled in the opposite sense from the sense of encircling of an adjacent pair, said first winding means being adapted to be energized by electric current and adapted when so energized to produce magnetic flux in the poles of said one member which is in the same direction in both poles of each pair of said first set and, the flux in one pair being of the opposite sense from the flux in an adjacent pair; and a second skein winding encircling a second set of pairs of adjacent poles of said one member displaced by one pole from said first set of adjacent poles, one pair of said second set being encircled in the opposite sense from the sense of encircling of an adjacent pair of said second set, said second magnetic member being adapted to be supported for relative rectilinear movement with respect to said first magnetic member, and said members being adapted to be positioned with respect to one another so that said poles thereof are in facing relation at right angles to said radial plane.

2. In a rectilinear inductive pickoff: a first magnetic member having at least four salient poles; a second magnetic member having salient poles corresponding in number to the number of poles of said first magnetic member with the poles of said second member being positioned alternately on one side and the other side of a right radial plane intersecting said second member; a first skein winding means encircling a first set of pairs of adjacent poles of said first magnetic member, one pair being encircled in the opposite sense from the sense of encircling of an adjacent pair, said first winding means being adapted to be energized by electric current and adapted when so energized to produce magnetic flux in the poles of said first magnetic member which is in the same direction in both poles of each pair of said first set, and the flux in one pair being of the opposite sense from the flux in an adjacent pair; and a second skein winding means encircling a second set of pairs of adjacent poles of said first magnetic member displaced by one pole from said first set of adjacent poles, one pair of said second set being encircled in the opposite sense from the sense of encircling of an adjacent pair of said second set, and said second magnetic member being adapted to be supported for relative rectilinear movement with respect to said first magnetic member, and said members being adapted to be positioned with respect to one another so that said poles thereof are in facing relation at right angles to said radial plane.

3. In a rectilinear inductive transducer; a first magnetic member having at least four salient poles; a second magnetic member having salient poles corresponding in number to the number of poles of said first magnetic member and the poles of said second member being positioned alternately on one side and the other side of a plane intersecting said second member; first winding means encircling a first set of pairs of adjacent poles of one of said members, one pair being encircled in a reversed sense from the sense of encircling of an adjacent pair, said first winding means being adapted to be energized by electric current and adapted when so energized to produce magnetic flux in the poles of said one member which instantaneously is in the same direction in both poles of each pair of said first set and, the flux in one pair being of the opposite sense from the flux in an adjacent pair; and second winding means encircling a second set of pairs of adjacent poles of said one member displaced by one pole from said first set of adjacent poles, one pair of said second set being encircled in a reversed sense from the sense of encircling of an adjacent pair of said second set, and said members being adapted to be positioned with respect to one another so that the poles thereof are in facing relation.

4. In an inductive device: first and second magnetic members each having at least four salient poles, said members being adapted to be positioned with said salient poles in angular alignment and in facing relation, and the poles of one of said members being positioned alternately on one side and the other side of a right radial plane intersecting said one of said members; first winding means encircling a first set of pairs of adjacent poles of one of said members, one pair being encircled in a reversed sense from the sense of encircling of an adjacent pair, said first winding means being adapted to be energized by electric current and adapted when so energized to produce magnetic flux in the poles of said one member which instantaneously is in the same direction in both poles of each pair of said first set and, the flux in one pair being of the opposite sense from the flux in an adjacent pair; and second winding means encircling a second set of pairs of adjacent poles of said one member displaced by one pole from said first set of adjacent poles, one pair of said second set being encircled in a reversed sense from the sense of encircling of an adjacent pair of said second set.

5. In an inductive device: first and second magnetic members each having at least four salient poles, and the poles of one of said members being positioned alternately on one side and the other side of a right radial plane intersecting said one of said members; first winding means encircling a first set of pairs of adjacent poles of one of said members, one pair of said first set being encircled in a reversed sense from the sense of encircling of an adjacent pair, and said first winding means being adapted to be energized by electric current; and second winding means encircling a second set of pairs of adjacent poles of said member having said first winding means thereon, said second set of pairs of adjacent poles being displaced by one pole from said first set of adjacent poles, one pair of said second set being encircled in a reversed sense from the sense of encircling of an adjacent pair of said second set, said second magnetic member being adapted to be supported for relative movement with respect to said first magnetic member, and said members being adapted to be positioned with respect to one another so that said poles thereof are in facing relation at right angles to said radial plane.

References Cited in the file of this patent

UNITED STATES PATENTS

| | | |
|---|---|---|
| 2,669,126 | Simmons | Feb. 16, 1954 |
| 2,870,422 | Gindes | Jan. 29, 1959 |